C. H. WILLIAMS, Jr.
ADJUSTABLE BRAKE HEAD.
APPLICATION FILED JAN. 10, 1910.
961,921.
Patented June 21, 1910.
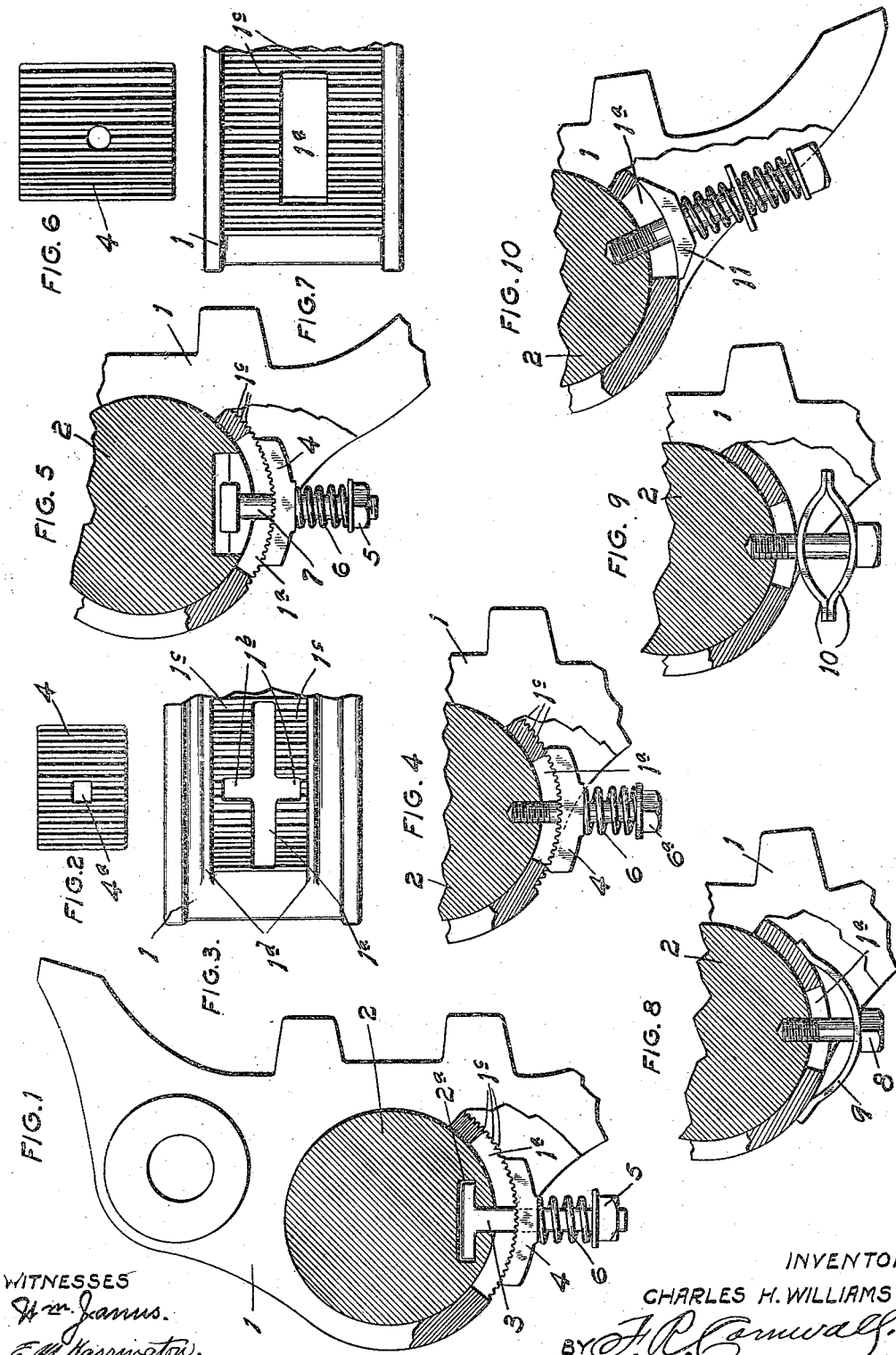
INVENTOR
CHARLES H. WILLIAMS Jr.
WITNESSES

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

ADJUSTABLE BRAKE-HEAD.

961,921.  Specification of Letters Patent.  Patented June 21, 1910.

Application filed January 10, 1910. Serial No. 537,138.

*To all whom it may concern:*

Be it known that I, CHARLES H. WILLIAMS, Jr., a citizen of the United States, residing at Chicago, Illinois, have invented a certain new and useful Improvement in Adjustable Brake-Heads, of which the following is a full, clear, and exact description, such as will enable others skilled in the art to which it appertains to make and use the same, reference being had to the accompanying drawings, forming part of this specification, in which—

Figure 1 is a side elevational view partly in section of my improved adjustable brake head. Fig. 2 is a face view of the locking block. Fig. 3 is a bottom fragmentary plan view of the brake head. Fig. 4 is a modified form. Fig. 5 is another modified form. Fig. 6 is a face view of the locking block shown in Fig. 5. Fig. 7 is a bottom fragmentary plan view of the brake head shown in Fig. 5. Figs. 8, 9 and 10 are various modifications.

This invention relates to a new and useful improvement in adjustable brake heads or brake beams, particularly the trussed type of brake beam, wherein there is a circular thrust block or sleeve at the end of the beam in which the compression member is seated, and to which the tension member is connected.

My present improvement contemplates a novel arrangement of the locking device for holding the brake head in adjustable positions to prevent the same tilting or falling by gravity.

In practice, the brake head is set approximately to the position it will occupy when applied to a wheel, the first application of the brakes causing the head to adjust itself or turn on the part of the brake beam on which it is mounted, so that it will properly adapt the shoe to the contour of the wheel. The means for holding the head in adjustable positions may be a serrated or corrugated locking block, shown in Figs. 1 to 7, inclusive, or a smooth faced friction element, shown in Figs. 8 to 10, inclusive, as desired.

In the drawings, 1 indicates the brake head having a circular socket for fitting on the part 2 of the brake beam. This part 2 is shown as a solid element, and hence may be considered a conventional illustration of the thrust block or sleeve at the end of the compression and tension members.

The part 2 on which the brake beam is mounted, is provided with a recess or opening for receiving a guide for the locking block, and a support for the spring, which yieldingly holds such locking block in position. In Fig. 1 this recess is T-shaped and the locking block guide and spring support 3 which fits therein, is in the form of a T-bolt, whose cross head fits in the T-shaped grooves $2^a$, and whose shank, throughout a part of its length, is angular in cross section where it passes through a square hole $4^a$ of the locking block 4, the end of said shank being threaded to receive a nut 5.

6 indicates a spring interposed between the nut 5 and the locking block 4, said spring tending to hold said locking block inwardly.

The wall of the socket in the brake head is provided with a circumferential slot $1^a$, which slot has laterals $1^b$, as shown in Fig. 3. On each side of the slot are serrations or corrugations $1^c$, for coöperation with a correspondingly serrated or corrugated inner face of the locking block.

$1^d$ are circumferentially disposed ribs on the brake head for guiding the locking block in its movement incident to the adjustment of the head on the beam.

In assembling the parts the head of the T-bolt is positioned in the T-shaped groove of the thrust block and the head slipped into position. Any well known means, such as a cotter pin passing through a perforated lock on the end of the thrust block, may be used for preventing the displacement of the head on the part on which it is mounted. The nut may be tightened up to place any desired compression on the spring, and hence the amount of said compression is variable.

In Fig. 4, instead of using a T-bolt, I have provided the thrust block with a tapped opening into which a machine bolt $6^a$ may be screwed to support the spring and yieldingly hold the locking block in position.

In Fig. 5, I have shown a square headed bolt 7, the square head of said bolt being received in an opening of the thrust block similar to the T-shaped bolt.

In Fig. 8 I have shown a machine bolt 8 and a semielliptical sleeve spring 9 strung thereon, whose ends bear against the outer face of the brake head. This construction does away with serrated teeth and a special locking block, the brake head being held in position by friction.

In Fig. 9 I have shown two semi-elliptic springs 10, whose ends coöperate with each other, one of which springs bears against the head of the securing bolt at its center and the other of which, at its center, coöperates with the outer face of the brakehead.

In Fig. 10 I have shown a smooth faced locking block 11, the construction in other respects being similar to that shown in Fig. 4.

It will be noticed with regard to all these forms, that the spring exerts its energy inwardly against the outer face of the brake head, and as the support for the spring is, in every instance, secured to the thrust block, or part of the brake beam on which the head is mounted, the above action of the spring tends to draw that part of the brake beam against the inner wall of the socket of the brake head, and in this manner rattling between the parts is prevented.

In the old style Robischung adjustable head, see Patent No. 485,823, dated November 8, 1892, the locking block was pressed inwardly against the thrust block by a spring whose energies were exerted outwardly against the head, thus tending to separate the head and thrust block at the point where the spring was located. This permitted of motion between the parts and considerable wear resulted.

I claim:

1. The combination of a brake head, a part on which said head is mounted and means for yieldingly and adjustably holding the head on said part, said means being supported by said part and engaging the outer face of the head.

2. The combination of an adjustable brake head, a part on which the same is mounted and an element extending from said part to the brake head and provided with means for yieldingly and adjustably holding said head in position.

3. The combination of an adjustable brake head, of a part on which the same is mounted, a holding block engaging the outer face of the adjustable head, a guiding means for said block carried by the part on which the head is mounted and yielding means bearing against said block.

4. The combination of an adjustable brake head, of a part on which it is mounted, a holding block engaging the outer face of the brake head, guiding means for said block mounted on said part and extending through said head and said block and yielding means arranged exteriorly of said head for exerting pressure against said block.

5. The combination of an adjustable brake head, a part on which the same is mounted, a block engaging the outer face of the head and means carried by said part for yieldingly forcing the block inwardly against the head.

6. The combination of an adjustable brake head, a part on which the same is mounted, holding means coöperating with the outer face of said head and a spring carried by said part forcing said holding means inwardly against said head.

7. The combination of an adjustable brake head, a part on which the same is mounted, means coöperating with the outer face of said head, a bolt separably connected to said part and a spring carried by said bolt and coöperating with said holding means.

8. The combination of an adjustable brake head, of a part on which the same is mounted, holding means coöperating with the outer face of the brake head, a bolt separably connected to said part and acting as a guide for said holding means and a spring supported by said bolt and coöperating with said holding means.

9. The combination of a brake head, a part on which said head is mounted and a spring exerting its energy inwardly against the outer face of the brake head and outwardly against the part of the beam on which the head is mounted for adjustably holding said head in position.

10. The combination of an adjustable brake head, a part on which the same is mounted, and means exerting a yielding outward pressure on said part and an inward pressure on the outer face of the brake head.

11. The combination of an adjustable brake head, a part on which the same is mounted, means exerting a yielding outward pressure on said part and an inward pressure on the outer face of the brake head and a friction block interposed between said means and the outer face of the brake head.

In testimony whereof I hereunto affix my signature in the presence of two witnesses, this 27th day of December, 1909.

CHARLES H. WILLIAMS, Jr.

Witnesses:
EDWARD T. WALKER,
J. W. WEINLANDS.